(12) United States Patent
Shigyo

(10) Patent No.: US 6,679,134 B2
(45) Date of Patent: Jan. 20, 2004

(54) TWIN-CLUTCH TRANSMISSION SYSTEM

(75) Inventor: Hidetoshi Shigyo, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/379,797

(22) Filed: Mar. 6, 2003

(65) Prior Publication Data
US 2003/0178278 A1 Sep. 25, 2003

(30) Foreign Application Priority Data
Mar. 19, 2002 (JP) ........................ 2002-075291

(51) Int. Cl.[7] ................ F16H 3/91; F16H 61/00
(52) U.S. Cl. .............. 74/336 R; 74/330; 74/331; 477/86
(58) Field of Search .............. 74/330, 331, 336 R; 477/80, 86

(56) References Cited

U.S. PATENT DOCUMENTS

| 5,819,585 A | 10/1998 | Darnell | |
|---|---|---|---|
| 5,890,392 A | 4/1999 | Ludanek et al. | |
| 5,915,512 A | 6/1999 | Adamis et al. | |
| 5,950,781 A | * 9/1999 | Adamis et al. | 74/330 |
| 6,009,768 A | * 1/2000 | Hoshiya et al. | 74/336 R |
| 6,427,550 B1 | * 8/2002 | Bowen | 74/336 R |
| 6,463,821 B1 | * 10/2002 | Reed et al. | 74/336 R |
| 6,490,944 B1 | * 12/2002 | Heinzel et al. | 74/336 R |

FOREIGN PATENT DOCUMENTS

| DE | 10036820 A1 | 2/2002 |
|---|---|---|
| GB | 2098679 A | 11/1982 |
| JP | 8-320054 | 12/1996 |
| JP | 9-196164 | 7/1997 |
| JP | 10-299884 | 11/1998 |
| JP | 10-318361 | 12/1998 |

* cited by examiner

*Primary Examiner*—Rodney H. Bonck
*Assistant Examiner*—Eric M. Williams
(74) *Attorney, Agent, or Firm*—McDermott, Will & Emery

(57) ABSTRACT

A transmission system is comprised of a twin-clutch transmission which comprises a first clutch for selecting a first gear-ratio group and a second clutch for selecting a second gear-ratio group. A control unit for controlling the twin-clutch transmission is arranged to calculate an estimated engine revolution speed produced in the event that one of two gear ratios adjacent to the present gear ratio is selected by executing one of upshift and downshift, and to disengage one of the first and second clutches which is engaged to select the gear-ratio group including the other of the two gear ratios adjacent to the present gear ratio when the estimated engine revolution speed is out of a normal operation speed range.

11 Claims, 5 Drawing Sheets

FIG.3A
| | 1 | 2 | 3 | 4 | 5 | 6 | R |
|---|---|---|---|---|---|---|---|
| C1 | ○ | | ○ | | ○ | | ○ |
| C2 | | ○ | | ○ | | ○ | |
FIG.3B
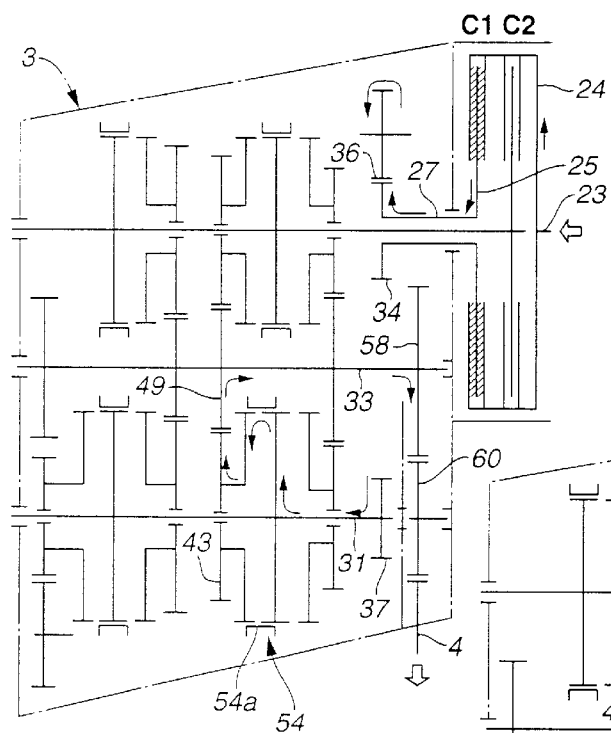
FIG.3C
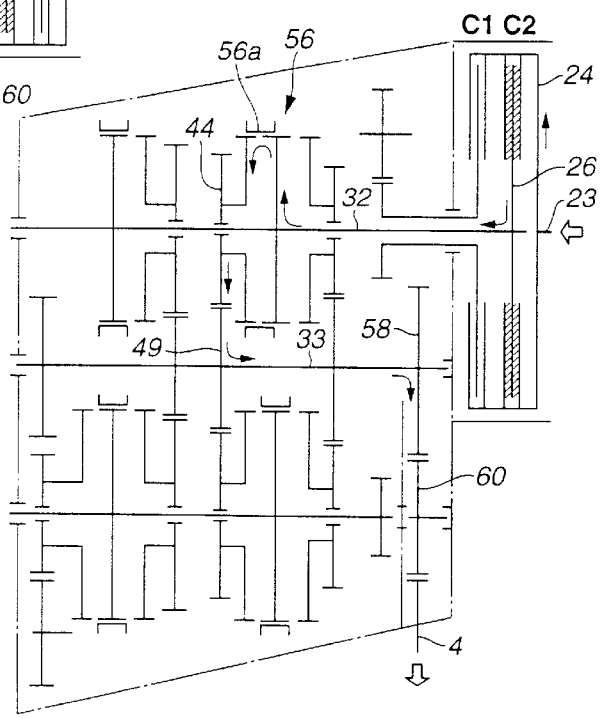

TWIN-CLUTCH TRANSMISSION SYSTEM

BACKGROUND OF THE INVENTION

The present invention relates to a twin-clutch transmission system which comprises a first clutch for selecting a gear ratio in a first gear ratio group and a second clutch for selecting a gear ration in a second gear ratio group.

Japanese Patent Provisional Publication No. 8-320054 discloses a twin-clutch transmission which comprises two gear-ratio groups, for which clutches are provided, respectively. During when a gear ratio of one of the two gear ratio groups is selected, the clutch for the other gear ratio group is put in a neutral position.

In reply to a shift command generated by an operation of a shift lever, shifting is executed by the following manner:

1. The clutch for the gear-ratio group in a resting state is disengaged.
2. A desired gear ratio in the rest-state gear-ratio group is selected.
3. The clutch for an operating-state gear-ratio group is disengaged, and the clutch for the resting-state gear-ratio group is engaged. This is so-called changeover of the clutches.
4. A used gear-ratio of the operating-state gear-ratio group is put in a neutral position.
5. After recognizing that the used gear-ratio is put in the neutral position, the clutch for the resting-state gear-ratio group is engaged.
6. The desired gear ratio of the resting-state gear-ratio group is put in the engaged state.

SUMMARY OF THE INVENTION

However, this twin-clutch transmission is required to further quickly execute a shift operation.

It is therefore an object of the present invention to provide an improved twin-clutch transmission system which is capable of shortening a shift time by employing a pre-shift control.

An aspect of the present invention resides in a transmission system which comprises a twin-clutch transmission, an engine revolution speed detector detecting an engine revolution speed, a gear ratio detector detecting a present gear ratio selected from the gear ratios of the first and second gear-ratio groups, and a control unit. The twin-clutch transmission comprises a first shaft having gears for producing a first gear-ratio group, a second shaft having gears for producing a second gear-ratio group, a first clutch being capable of connecting the first shaft to an internal combustion engine so as to be selectable of one gear ratio of the first gear-ratio group, and a second clutch being capable of connecting the second shaft to the engine so as to be selectable of one gear ratio of the second gear-ratio group. The control unit coupled to the transmission, the engine revolution speed detector and the gear ratio detector. The control unit is configured to calculate an estimated engine revolution speed produced in the event that one of two gear ratios adjacent to the present gear ratio is selected by executing one of upshift and downshift, on the basis of the engine revolution speed, the present gear ratio and the one of the two gear ratios adjacent to the present gear ratio, to determine whether the estimated engine revolution speed is out of a normal engine revolution speed range, and to disengage one of the first and second clutches which is engaged to select the gear-ratio group including the other of the two gear ratios adjacent to the present gear ratio when the estimated engine revolution speed is out of the normal operation speed range.

Another aspect of the present invention resides in a transmission control system controlling a twin-clutch transmission which comprises a first clutch for connecting a first gear-ratio group to an internal combustion engine and a second clutch for connecting a second gear-ratio group to the engine, the transmission control system comprising: a control unit configured to obtain an engine revolution speed, to obtain a present gear ratio in operation, to calculate an estimated downshift engine revolution speed produced in the event that a downshift-side gear ratio adjacent to the present gear ratio is selected by downshift, on the basis of the engine revolution speed, the present gear ratio and the downshift-side gear ratio, to determine whether the estimated downshift engine revolution speed is out of a normal engine revolution speed range, to execute a pre-upshift control when the estimated downshift engine revolution speed is out of the normal engine revolution speed range, the pre-upshift control including an operation for disengaging the clutch for selecting the gear-ratio group which includes an upshift-side gear ratio adjacent to the present gear ratio, to calculate an estimated upshift engine revolution speed produced in the event that the upshift-side gear ratio is selected by upshift from the present gear ratio, on the basis of the engine revolution speed, the present gear ratio and the upshift-side gear ratio, to determine whether the estimated upshift engine revolution speed is out of a normal engine revolution speed range, and to execute a pre-downshift control when the estimated upshift engine revolution speed is out of the normal engine revolution speed range, the pre-downshift control including an operation for disengaging the clutch for selecting the gear-ratio group which includes the downshift-side gear ratio.

A further another aspect of the present invention resides in a method of controlling a twin-clutch transmission which comprises a first shaft having gears for producing a first gear-ratio group, a second shaft having gears for producing a second gear-ratio group, a first clutch being capable of connecting the first shaft to an internal combustion engine so as to be selectable of one gear ratio of the first gear-ratio group, and a second clutch being capable of connecting the second shaft to the engine so as to be selectable of one gear ratio of the second gear-ratio group, the method comprising: detecting an engine revolution speed; detecting a present gear ratio selected from the gear ratios of the first and second gear-ratio groups; calculating an estimated engine revolution speed produced when one of two gear ratios adjacent to the present gear ratio is selected by executing one of upshift and downshift, on the basis of the engine revolution speed, the present gear ratio and the one of the two gear ratios adjacent to the present gear ratio; determining whether the estimated engine revolution speed is out of a normal engine revolution speed range; and disengaging one of the first and second clutches which is engaged to select the gear-ratio group including the other of the two gear ratios adjacent to the present gear ratio when the estimated engine revolution speed is out of the normal operation speed range.

The other objects and features of this invention will become understood from the following description with reference to the accompanying drawings.

BRIEF DESCRIPTION OF THE DRAWINGS

FIG. 3A is a fundamental engagement operation table of clutches of the twin-clutch transmission of, FIG. 1, FIG. 3B is a skeleton diagram showing a torque flow in the twin-clutch transmission when third gear ratio of an odd-number speed gear-ratio group is selected, and FIG. 3C is a skeleton diagram showing a torque flow in the twin-clutch transmission when fourth gear ratio of an even-number speed gear-ratio group is selected.

DETAILED DESCRIPTION OF THE INVENTION

Referring to FIGS. 1 through 6, there is shown an embodiment of a twin clutch transmission system according to the present invention.

Figure 1:
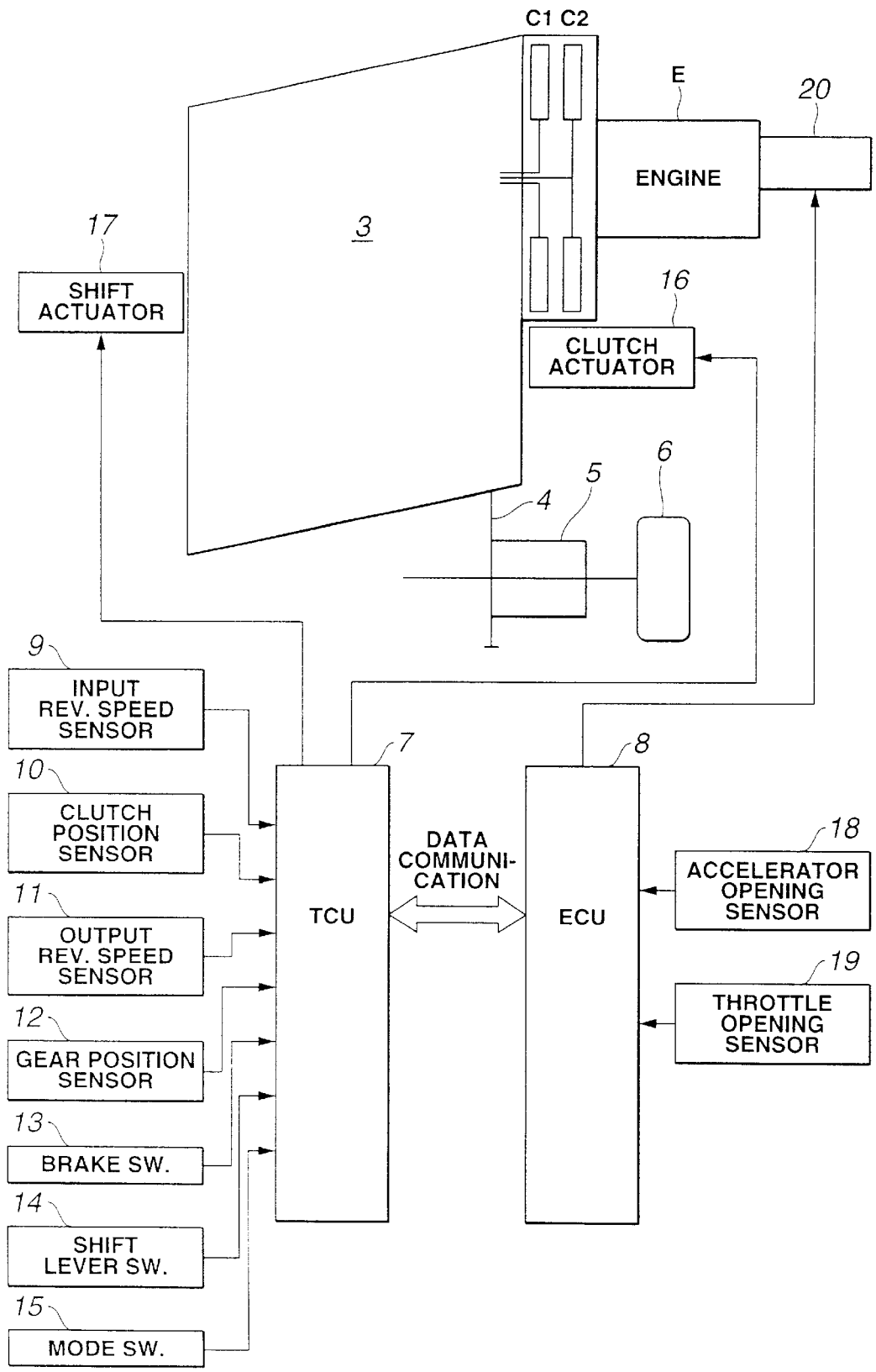
FIG. 1 is a schematic view showing a transmission system of a twin-clutch transmission of an embodiment according to the present invention.

As shown in FIG. 1, an input side of a gear transmission 3 is connected to an internal combustion engine E through a first clutch C1 and a second clutch C2. An output side of gear transmission 3 is connected to driving wheels 6 through a final ring gear 4 and a differential gear 5.

First clutch C1 is a clutch for selecting the odd-number speed gear-ratio group (first-speed gear, third-speed gear and fifth-speed gear) and a reverse-speed gear from forward six speeds and one reverse-speed of gear transmission 3. Second clutch C2 is a clutch for selecting an even-number speed gear-ratio group (second-speed gear, fourth-speed gear and sixth-speed gear) from forward six gears and one reverse gear of gear transmission 3.

Gear transmission 3 receives driving torque of engine E through one of first clutch C1 and second clutch C2, and outputs the driving torque through gears and shafts according to a selected gear ratio and through a final ring gear 4 and a differential gear 5 to driving wheels 6.

Referring to an electronic control system of the twin-clutch transmission system, as shown in FIG. 1, a transmission control unit (TCU) 7 and an engine control unit (ECU) 8 are communicated with each other so as to bidirectionally transmit information.

Referring to a transmission control system, as shown in FIG. 1, the twin-clutch transmission system comprises an input revolution speed sensor 9 acting as engine speed detecting means, a clutch position sensor 10, an output revolution speed sensor 11, a gear position sensor 12 acting as selected gear-ratio detecting means, a brake switch 13, a shift lever switch 14, a mode switch 15, a clutch actuator 16, and a shift actuator 17.

Input revolution speed sensor 9 detects an input revolution speed of first clutch C1 when first clutch C1 is engaged, and an input revolution speed of second clutch C2 when second clutch C2 is engaged. Input revolution speed sensor 9 is coupled to transmission control unit 7 and outputs a signal indicative of the detected revolution speed to transmission control unit 7.

Clutch position sensor 10 detects whether first clutch C1 is in an engaged state or in a disengaged state and whether second clutch C2 is in an engaged state or in a disengaged state. Clutch position sensor 10 is coupled to transmission control unit 7 and outputs a signal indicative of the states of first and second clutches C1 and C2 to transmission control unit 7.

Output revolution speed sensor 11 detects an output revolution speed of gear transmission 3. Output revolution speed sensor 11 is coupled to transmission control unit 7 and outputs a signal indicative of the output revolution speed to transmission control unit 7.

Gear position sensor 12 detects a selected gear position corresponding to a gear ratio selected by the operation of shift actuator 17. Gear position sensor 12 is coupled to transmission control unit 7 and outputs a signal indicative of the selected gear ratio to transmission control unit 7.

Brake switch 13 detects whether a braking operation is being executed or not. Brake switch 13 is coupled to transmission control unit 7 and outputs a signal indicative of the braking operation to transmission control unit 7.

Shift lever switch 14 detects an operational position of a shift lever manipulated by a driver. Shift lever switch 14 is coupled to transmission control unit 7 and outputs a signal indicative of the shift lever operation position to transmission control unit 7.

Mode switch 15 detects a shift mode selected by the driver. Mode switch 15 is coupled to transmission control unit 7 and outputs a signal indicative of the shift mode to transmission control unit 7.

Clutch actuator 16 is coupled to first and second clutches C1 and C2 and transmission control unit 7, and executes an engagement/disengagement control and a clutch changeover control of first and second clutches C1 and C2 on a control command outputted from transmission control unit 7.

Shift actuator 17 is coupled to gear transmission 3 and transmission control unit 7, and controls a 1st–3rd shift fork (not shown), a 5th-R shift fork, a 2nd–4th shift fork and a 6th shift fork, on the basis of a control command outputted from transmission control unit 7.

Referring to an engine control system of the twin-clutch transmission system, there is provided an accelerator opening sensor 18, a throttle opening sensor 19 and an electrically controlled throttle unit 20 as shown in FIG. 1.

Accelerator opening sensor 18 detects an accelerator manipulated quantity. Accelerator opening sensor 18 is c is coupled to engine control unit 8 and outputs a signal indicative of the accelerator manipulated quantity to engine control unit 8.

Throttle opening sensor 18 detects an opening degree of a throttle valve of electrically control throttle unit 20 and outputs a signal indicative of the opening degree of the throttle valve to engine control unit.

Electrically controlled throttle unit 20 is coupled to engine control unit 20, and controls the opening of the throttle value disposed in an intake-air line of engine E on the basis of a control command outputted from engine control unit 8.

Transmission control unit 7 sends a demanded driving torque to engine control unit 8. Engine control unit 8 controls electrically controlled throttle unit 20 and varies an ignition timing of engine E according to the demanded driving torque to realize the demanded driving torque.

Figure 2:
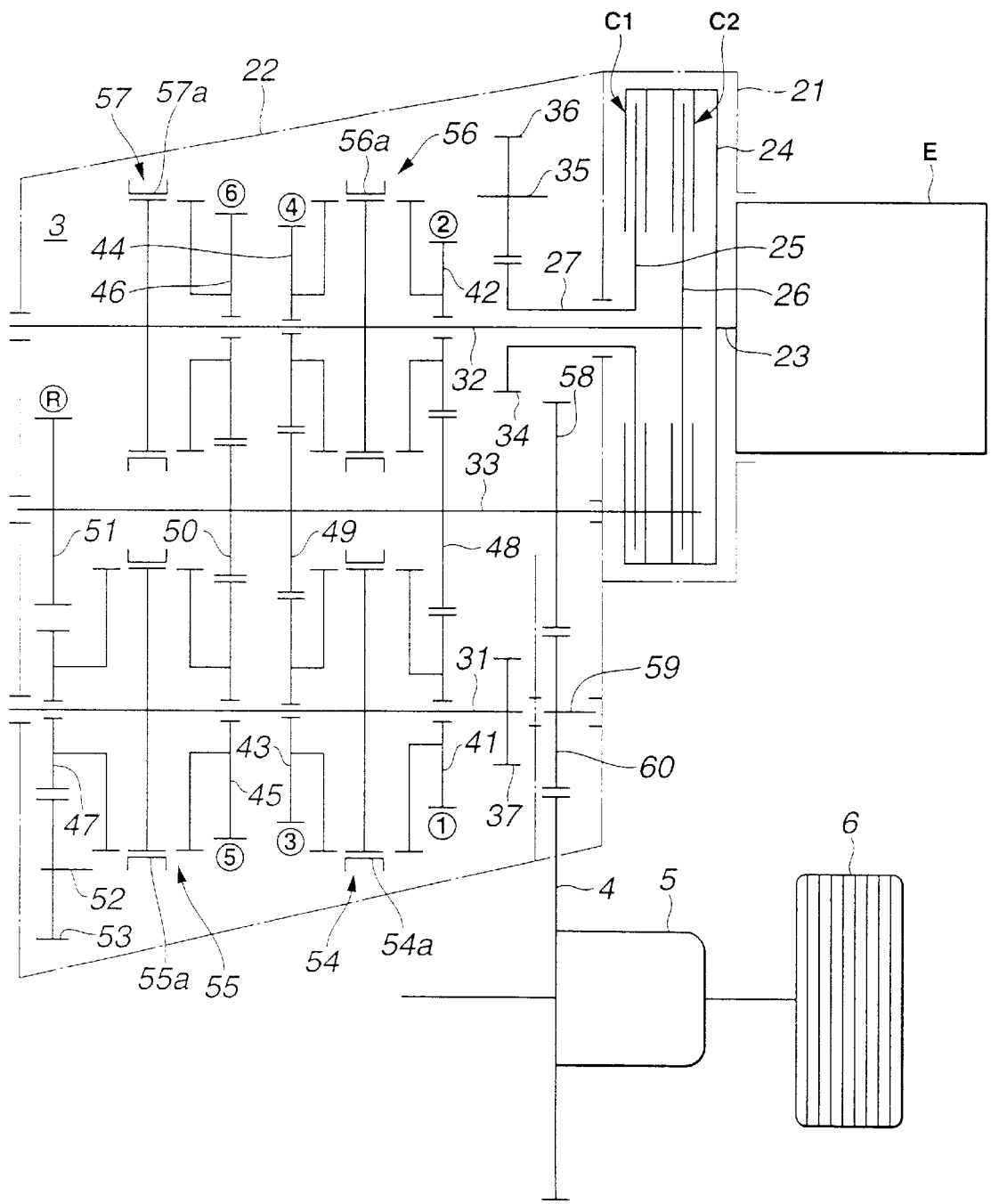
FIG. 2 is a skeleton diagram showing the twin-clutch transmission of the embodiment.

FIG. 2 is a skeleton view showing the twin-clutch transmission system of the embodiment according to the present invention.

Engine E is connected to first clutch C1 and second clutch C2 disposed in a clutch case 21. Gear transmission 3 is disposed in a transmission case 22 and connected to first and second clutches C1 and C2. Further, gear transmission 3 is connected to driving wheels 6 through final ring gear 4 and differential gear 5.

A clutch input member 24 is commonly used by first and second clutches C1 and C2 and connected to an engine output shaft 23 of engine E. Clutch input member 24 is disposed in clutch case 21. First clutch C1 is provided between clutch input member 24 and a first clutch output member 25. Second clutch C2 is provided between clutch input member 24 and a second clutch output member 26. First clutch output member 25 is connected to a first hollow input shaft 27. Second clutch output member 26 is connected to a second input shaft 32 which is disposed in a hollow portion of first hollow input shaft 27.

First and second input shaft 27 and 32, which are coaxially arranged, extend from clutch case 21 to transmission case 22 upon penetrating a partition wall. First input shaft 31 acts as a transmission input shaft when first clutch C1 is engaged and when one of the odd-number speed gear-ratios or reverse gear is selected. Second input shaft 32 acts as a transmission input shaft when second clutch C2 is engaged and when one of even-number speed gears is selected. First and second input shafts 31 and 32 and a common output shaft 33 are arranged in parallel in transmission case 22.

The rotational driving force of first hollow input shaft 27 is transmitted to first input shaft 31 through a first input gear 34 connected to first hollow input shaft 27, a second input gear 36 connected to an idle shaft 35 and a third input gear 37 connected to input shaft 31. Second input gear (idle gear) 36 is engaged with first input gear 34 and third input gear 37.

A first-speed drive gear 41, a third-speed drive gear 43, a fifth-speed drive gear 45 and a reverse drive gear 47 are rotatably connected to first input shaft 31. A second-speed drive gear 42, a fourth-speed drive gear 44 and a sixth-speed drive gear 46 are rotatably connected to second input gear 32. A first-second-speed driven gear 48, a third-fourth-speed driven gear 49, a fifth-sixth-speed driven gear 50 and a reverse driven gear 51 are fixed to or integrally formed with output shaft 33. A reverse idle gear 53 is fixedly connected to an idle shaft 52 and is engaged with a reverse drive gear 47 and a reverse driven gear 51.

Provided on first input shaft 31 are a 1st–3rd speed synchromesh mechanism 54 for executing a changeover among a neutral position, a 1st-speed drive gear position and a 3rd-speed drive gear position, and a 5th-R speed synchromesh mechanism 55 for executing a changeover among a neutral position, a 5th-speed drive gear position and a reverse drive gear position. 1st–3rd speed synchromesh mechanism 54 comprises a sleeve 54a engaged with a 1st–3rd speed shift fork (not shown). 5th-R speed synchromesh mechanism 55 comprises a sleeve 55a engaged with a 5th-R speed shift fork (not shown).

Provided on second input shaft 32 are a 2nd–4th speed synchromesh mechanism 56 for executing a changeover among a neutral position, a 2nd-speed drive gear position and a 4th-speed drive gear position, and a 6th speed synchromesh mechanism 55 for executing a changeover between a neutral position and a 6th-speed drive gear position. 2nd–4th speed synchromesh mechanism 56 comprises a sleeve 56a engaged with a 2nd–4th speed shift fork (not shown). 6th speed synchromesh mechanism 57 comprises a sleeve 57a engaged with a 6th speed shift fork (not shown).

A final gear 58 is fixed to or integrally connected to an end portion of output shaft 33. Final gear 58 and final ring gear 4 are engaged with a final idle gear 50 fixedly connected to idle shaft 59. The rotational driving force of output shaft 33 is transmitted through final gear 58 and final idle gear 60 to final ring gear 4.

Subsequently, the manner of operation of the transmission of the first embodiment will be discussed hereinafter.

FIG. 3A shows a fundamental engagement table of clutches C1 and C2 according to the selected gear ratio (speed gear). First clutch C1 is engaged when first speed is selected. Second clutch C2 is engaged when second speed is selected. First clutch C1 is engaged when third-speed gear is selected. Second clutch C2 is engaged when fourth speed is selected. First clutch C1 is engaged when fifth-speed gear is selected. Second clutch C2 is engaged when sixth speed is selected. First clutch C1 is engaged when reverse speed is selected.

That is, first clutch C1 is engaged when a gear ratio of the odd-number speed gear-ratio group (including reverse speed) is selected, and second clutch C1 is engaged when a gear ratio of the even-number speed gear-ratio group is selected. Accordingly, when upshift is sequentially executed, first and second clutches C1 and C2 are alternately engaged. Similarly, when downshift is sequentially executed, first and second clutches C1 and C2 are alternately engaged.

A torque flow at 3rd-speed gear ratio of the odd-number speed gear-ratio group will be discussed with reference to FIG. 3B. When the 3rd-speed gear ratio is selected, first clutch C1 is engaged, and sleeve 54a of 1st–3rd speed cynchromesh mechanism 54 is moved from the neutral position to a position for selecting 3rd-speed drive gear 43.

By this selection of the 3rd-speed, the engine torque is transmitted in the order of engine output shaft 23→clutch input member 24→first clutch C1→first clutch output member 25→first hollow input shaft 27→first input gear 34→second input gear 36→third input gear 37→first input shaft 31. Further, the engine torque is transmitted from first input shaft 31 to final ring gear 4 through 1st–3rd speed synchromech mechanism 54, 3rd-speed drive gear 43, 3rd–4th speed driven gear 49, output shaft 33, final gear 58 and final idle gear 60 in the order of mention.

A torque flow at 4th-speed gear ratio of the even-number speed gear-ratio group will be discussed with reference to FIG. 3C. When 4th-speed gear ratio is selected, second clutch C2 is engaged, and sleeve 56a of 2nd–4th speed synchromesh mechanism 56 is moved from the neutral position to a position for selecting 4th-speed drive gear 44.

By this selection of 4th-speed gear ratio, the engine torque is transmitted in the order of engine output shaft 23→clutch input member 24→second clutch C2→second input shaft 32→2nd–4th speed synchromech mechanism 56→4th-speed drive gear 44→3rd–4th speed driven gear 49→output shaft 33→final gear 58→final idle gear 60.

[Pre-Shift Control Processing]

Figure 4:
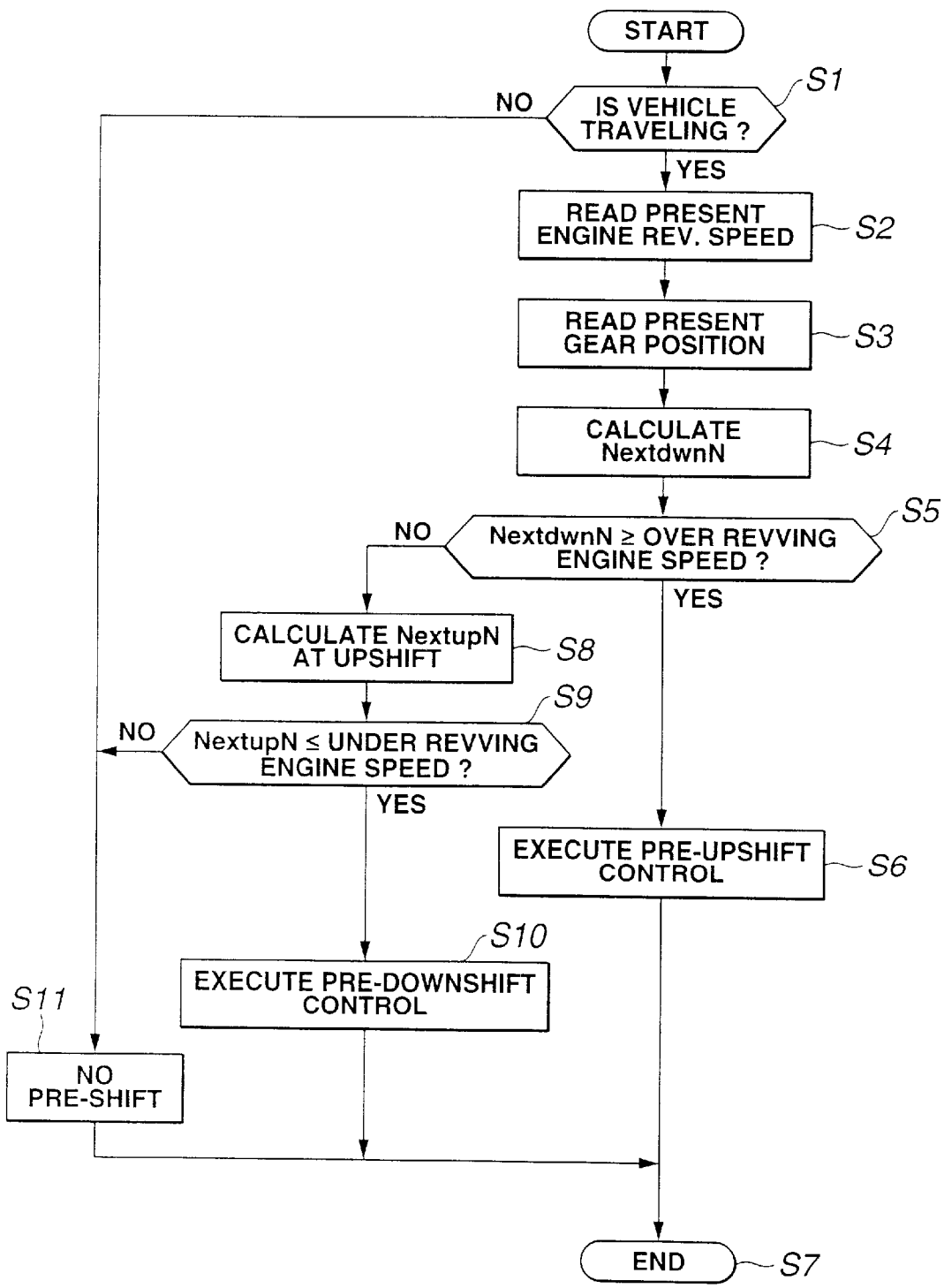
FIG. 4 is a flowchart showing a pre-shift control processing which is executed by a transmission control unit of the twin-clutch transmission of FIG. 1.

FIG. 4 is a flowchart showing a pre-shift control processing executed by transmission control unit 7.

At step S1 in the flowchart of FIG. 4, transmission control unit 7 determines whether or not the vehicle is traveling. When the determination at step S1 is affirmative, the routine proceeds to step S2. When the determination at step S1 is negative, the routine proceeds to step S11. The determination as to whether the vehicle is traveling is executed by checking that the vehicle speed is not zero, that the selected shift lever position is not N, P or R, and that at least one of first and second clutches C1 and C2 is in full engagement state.

At step S2 subsequent to the execution of step S1, control unit 7 reads a present engine revolution speed. At step S3 subsequent to the execution of step S2, control unit 7 reads a present gear ratio.

At step S4 subsequent to the execution of step S3, control unit 7 calculates an estimated engine revolution speed NextdwnN which is an estimated engine revolution speed generated in the event that a downshift is executed from the present gear ratio to the adjacent gear ratio and the vehicle is traveling at the downshifted gear ratio. More specifically, estimated engine revolution speed Nextdwn N is calculated using the present engine revolution speed, a present gear ratio, and the next gear ratio achieved by a downshift. Estimated engine revolution speed NextdwnN is obtained using the following expression. Step S4 functions as a first calculating section of an estimated engine revolution speed calculating means.

$$NextdwnN = (\text{present revolution speed}) \times (\text{downshifted gear ratio} / \text{present gear ratio})$$

At step S5 control unit 7 determines whether or not estimated engine revolution speed NextdwnN is greater than or equal to an over-revving engine revolution speed. When the determination at step S5 is affirmative (NextdwnN≧over-revving engine revolution speed), the routine proceeds to step S6. When the determination at step S5 is negative (NextdwnN<over-revving engine revolution speed), the routine proceeds to step S8. The over-revving engine revolution speed represents overspeeding of engine E and is out of a normal engine revolution speed range within which engine E is operated. Similarly, an under-revving engine revolution speed represents underspeeding of engine E and is out of the normal engine revolution speed range. If the engine revolution speed becomes the under-revving engine revolution speed, engine E will stall.

At step S6 control unit 7 executes a pre-upshift control for maintaining the obtained gear ratio by disengaging the clutch (one of first and second clutches C1 and C2) for selecting the gear-ratio group including a gear ratio obtained by upshifting from the present gear ratio and stroking a shift fork so as to select a planned upshifted gear ratio. Thereafter, the routine proceeds to step S7 to terminate the present routine. Step S6 functions as a pre-upshift control section of a pre-shift control means.

At step S8 subsequent to the negative determination at step S5, control unit 8 calculates an estimated engine revolution speed NextupN which is obtained when an upwnshift from the present gear ratio to the adjacent gear ratio is executed and when the vehicle is traveling at the adjacent gear ratio. More specifically, estimated engine revolution speed NextupN is calculated using the present engine revolution speed, a present gear ratio, and the next gear ratio achieved by upshift. Estimated engine revolution speed NextupN is obtained using the following expression. Step S8 functions as a second calculating section of the estimated engine revolution speed calculating means.

$$NextupN = (\text{present engine revolution speed}) \times (\text{upshifted gear ratio} / \text{present gear ratio})$$

At step S9 control unit 7 determines whether or not estimated engine revolution speed NextupN is smaller than or equal to the over-revving engine revolution speed. When the determination at step S9 is affirmative (NextupN≦under-revving engine revolution speed), the routine proceeds to step S10. When the determination at step S9 is negative (NextdwnN>under-revving engine revolution speed), the routine proceeds to step S11.

At step S10 control unit 7 executes a pre-downshift control for maintaining the obtained gear ratio by disengaging the clutch (one of first and second clutches C1 and C2) for selecting the gear-ratio group including the gear ratio obtained by downshifting from the present gear ratio and stroking a shift fork so as to select a planned downshift gear ratio. Thereafter, the routine proceeds to step S7 to terminate the present routine. Step S10 functions as a pre-downshift control section of a pre-shift control means.

At step S11 subsequent to the negative determination at step S1 or the negative determination at step S9, control unit 7 terminates the present routine without executing the pre-shift control.

[Operation of Pre-Shift Control]

When the vehicle is traveling under a low-load condition such that the vehicle speed is gradually increased although the accelerator opening is constant, the program in FIG. 3 proceeds in the order of step S1→step S2Δstep S3→step S4, and control unit 7 calculates estimated engine revolution speed NextdwnN at a large value at step S4.

In the event that the next upshift will be executed in near future as the vehicle speed is increased to a limit zone of the present selected gear ratio, control unit 7 calculates, at step S4, estimated engine revolution speed NextdwnN so that the estimated speed engine revolution speed NextdwnN is greater than or equal to the over-revving engine revolution speed. Accordingly, the affirmative determination is made at step S5, and the program proceeds through step S5 to step S6.

At step S6, control unit 7 executes a pre-upshift control wherein the clutch (one of first and second clutches C1 and C2) for selecting the gear ratio group including a next upshifted gear ratio is disengaged and the shift fork is stroked to select a new gear ratio achieved by the next upshift prior to the next upshift operation. By executing this pre-upshift control, this gear ratio selecting state is maintained.

In the event that the vehicle travels under a high-load condition in that the vehicle speed is gradually decreased although the throttle opening is kept constant, the program in FIG. 3 proceeds from step S1 to step S8 in the order of step S1→step S2→step S3→step S4→step S5→step S8. At step S8 control unit 7 calculates estimated engine revolution speed NextupN, which is the engine revolution speed if the upshift is executed under this vehicle travel condition, so as to take a small value. Thereafter, when the next downshift will be executed in near future as the vehicle speed is decreased to a limit zone of the present selected gear ratio, control unit 7 calculates estimated engine revolution speed NextupN so that the estimated engine revolution speed NextupN is smaller than or equal to the under-revving engine revolution speed at step S8. Accordingly, the affriamtive determination is made at step S9, and the program proceeds through step S9 to step S10.

At step S10 control unit 7 executes a pre-downshift control wherein the clutch (one of first and second clutches C1 and C2) for selecting the gear ratio group including a next downshifted gear ratio is disengaged and the shift fork is stroked to select a new gear ratio achieved by the next downshift prior to the next downshift operation. By executing this pre-downshift control, this gear ratio selecting state is maintained.

[Comparison of Shift Time]

Herein, there will be discussed a comparison between a shift time in 2nd→3rd upshift control with the pre-upshift control shown in FIG. 5 and 2nd→3rd upshift without the pre-upshift control shown in FIG. 6.

Figure 6:
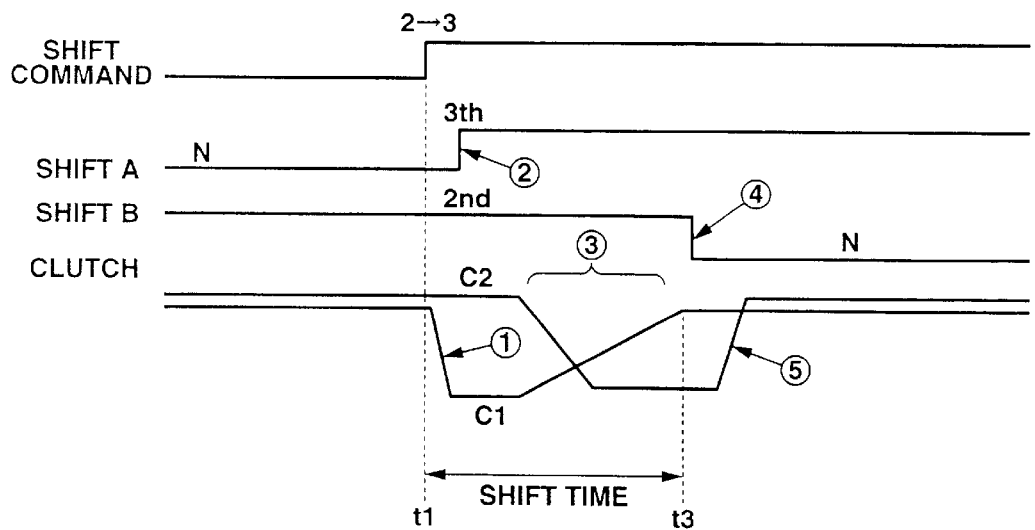
FIG. 6 is time charts of a shift command, a sift actuator operation and engagement/disengagement operations of both clutches during 2nd→3rd upshift without the pre-shift control.

As shown in FIG. 6, the 2nd→3rd upshift control without the pre-upshift control is executed as follows.

When a 2nd→3rd upshift command is outputted according to the operation of the shift lever at time t1, the following operations are sequentially executed.

1) First clutch C1 for the odd-number speed gear-ratio group is disengaged. The odd-number speed gear-ratio group is a resting gear transmission line when the second-speed gear ratio is selected.

2) Sleeve 54a of 1st–3rd speed synchromesh mechanism 54 included in the odd-number speed gear-ratio group is moved from the neutral position to the third speed selecting position.

3) Then, second clutch C2 for the even-number speed gear-ratio group is disengaged and first clutch C1 for the odd-number speed gear-ratio group is engaged. That is, a so-called changeover of clutches C1 and C2 is executed. The terminated point of this changeover of clutches C1 and C2 is defined as time t3.

4) After the changeover of clutches C1 and C2 is executed, sleeve 56a of 2nd–4th speed synchromesh mechanism 56 for selecting the second-speed is returned to the neutral position.

5) After sleeve 56a is returned to the neutral position, second clutch C2 for the even-number speed gear-ratio group is engaged for the next shift.

By executing these operations, the upshift from the second speed to the third speed is completed.

Figure 5:
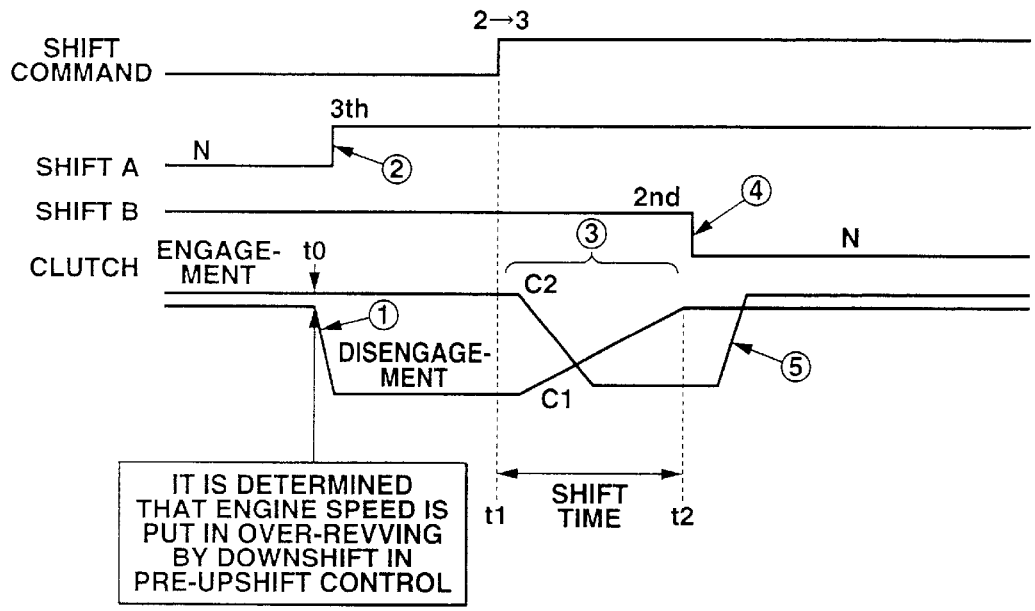
FIG. 5 is time charts of a shift command, a sift actuator operation and engagement/disengagement operations of both clutches during 2nd→3rd upshift with the pre-shift control.

Subsequently, as shown in FIG. 5, the 2nd→3rd upshift control with the pre-upshift control according to the present invention is executed as follows.

When estimated engine revolution speed NextdwnN becomes greater than or equal to the over-revving engine revolution speed, the following operations are sequentially executed.

1) At time t0 when it is determined that estimated engine revolution speed NextdwnN becomes greater than or equal to the over-revving engine revolution speed, that is, when it is determined that the down shift is not executed, first clutch C1 for the odd-number speed gear-ratio group is disengaged.

2) Sleeve 54a of 1st–3rd speed synchromesh mechanism 54 included in the odd-number speed gear-ratio group is moved from the neutral position to the third speed selecting position.

3) When the 2nd→3rd upshift command is outputted according to the operation of the shift lever at the time t1, second clutch C2 for the even-number speed gear-ratio group is disengaged, and first clutch C1 for the odd-number speed gear-ratio group is engaged. That is, the changeover of clutches C1 and C2 is executed. The terminated point of this changeover of clutches C1 and C2 is denoted by time t2 in FIG. 5.

4) After the changeover of clutches C1 and C2 is executed, sleeve 56a of 2nd–4th speed synchromesh mechanism 56 for selecting the second speed is returned to the neutral position.

5) After sleeve 56a is returned to the neutral position, second clutch C2 for the even-number speed gear-ratio group in the resting state is engaged for the next shift.

By executing these operations, the upshift from the second speed to the third speed is completed.

As discussed above, the shift time of the 2nd→3rd upshift without the pre-shift control ranges from the time t1 at which the 2nd→3rd upshift command is outputted to the time t2 at which the changeover of clutches C1 and C2 is terminated, as shown in FIG. 6. This shift time taken by the 2nd→3rd upshift without the pre-shift control includes all of time periods needed for the disengagement of first clutch C1, the movement of sleeve 54a from the neutral position to the third speed position, and the changeover of clutches C1 and C2.

In contrast to this, in case that the 2nd→3rd upshift with the pre-shift control according to the present invention is executed, the shift time thereof ranges from the time t1 at which the 2nd→3rd upshift command is outputted to the time t2 at which the changeover of clutches C1 and C2 is terminated, as shown in FIG. 5.

This shift time taken by the 2nd→3rd upshift with the pre-shift control according to the present invention includes only a time period needed for the changeover of clutches C1 and C2. In other words, the operations denoted by 1) and 2) have been already executed by means of the pre-shift control, prior to the output of the shift command. Accordingly, the shift time of the 2nd→3rd upshift with the pre-shift control does not include the time period needed for the disengagement of first clutch C1 and the movement of sleeve 54a from the neutral position to the third speed position.

That is, according to the present invention, by checking the inexcutable shift pattern before the shifting is executed, and by executing the pre-shift control at a possible shift pattern, it becomes possible to largely shorten the shift time (shift period) as compared with that by the shift without the pre-shift control. This arrangement enables the shift time of the shift with pre-shift control to be generally the same as a time period for the changeover shift of a general automatic transmission.

Advantages assured by the shift control according to the present invention will be discussed hereinafter.

(1) In the twin-clutch transmission comprising first clutch C1 for the odd-number speed gear-ratio group and second clutch C2 for the even-number speed gear-ratio group, an adjacent upshift gear ratio or adjacent downshift gear ratio relative to the present gear ratio is detected, and estimated engine revolution speed NextupN or NextdwnN is calculated in the case that the vehicle travels at the gear ratio of at least one of adjacent upshift gear ratio or adjacent downshift gear ratio. Further, when estimated engine revolution speed NextupN or NextdwnN is out of the normal operation engine revolution speed range, control unit 7 determines that there is no shift to the gear ratio corresponding to the estimated engine revolution speed. According to this determination, the pre-shift control for disengaging the clutch for selecting the gear-ratio group including the other gear ratio is executed. This arrangement enables a time period needed for disengaging the clutch to be decreased and shortens the shift time of the twin-clutch transmission system according to the present invention.

(2) The shift control system according to the present invention comprises step S4 for calculating estimated engine revolution speed NextdwnN in the event that the vehicle travels at a downshifted gear ratio, and the step S8 for calculating estimated engine revolution speed NextupN in the event that the vehicle travels at a upshifted gear ratio, the step S6 for disengaging the clutch for selecting the gear ratio group including the upshifted gear ratio, and the step S10 for disengaging the clutch for selecting the gear ratio group including the downshifted gear ratio. Therefore, it becomes possible to execute the pre-shift control prior to the upshift and downshift. This shortens the time period for the upshift and the downshift of the twin-clutch transmission.

(3) At step S6 or S10, the pre-shift control for maintaining the gear ratio selecting state is executed by disengaging the clutch for the gear ratio group including the gear ratio obtained by upshifting or downshifting the present gear ratio is disengaged, and by stroking a shift fork so as to select the next upshift gear ratio or next downshift gear ratio. Therefore, both of the time period for disengaging the clutch and the time period for moving the shift fork from the neutral position to the desired gear ratio are shortened, and the shift time is further shortened.

This application is based on Japanese Patent Applications No. 2002-75291 filed on Mar. 19, 2002 in Japan. The entire contents of this Japanese Patent Application are incorporated herein by reference.

Although the invention has been described above by reference to a certain embodiment of the invention, the invention is not limited to the embodiment described above. Modifications and variations of the embodiments described above will occur to those skilled in the art, in light of the above teaching. For example, as first and second clutches C1 and C2, a hydraulic clutch, which hydraulically controls the engagement force of the clutch, and an electromagnetic clutch, which is capable of directly controlling the engagement force of the clutch may be employed. Further, although the embodiment has shown and described a forward six-speed and reverse one-speed transmission, the construction of the transmission and the setting of gear ratios of the transmission are not limited by the embodiment.

The scope of the invention is defined with reference to the following claims.

What is claimed is:

1. A transmission system comprising:
    a twin-clutch transmission comprising,
        a first shaft having gears for producing a first gear-ratio group,
        a second shaft having gears for producing a second gear-ratio group,
        a first clutch being capable of connecting the first shaft to an internal combustion engine so as to be selectable of one gear ratio of the first gear-ratio group,
        a second clutch being capable of connecting the second shaft to the engine so as to be selectable of one gear ratio of the second gear-ratio group;
    an engine revolution speed detector detecting an engine revolution speed;
    a gear ratio detector detecting a present gear ratio selected from the gear ratios of the first and second gear-ratio groups; and
    a control unit coupled to the transmission, the engine revolution speed detector and the gear ratio detector, the control unit being configured,
        to calculate an estimated engine revolution speed produced in the event that one of two gear ratios adjacent to the present gear ratio is selected by executing one of upshift and downshift, on the basis of the engine revolution speed, the present gear ratio and the one of the two gear ratios adjacent to the present gear ratio,
        to determine whether the estimated engine revolution speed is out of a normal engine revolution speed range,
        to disengage one of the first and second clutches which is engaged to select the gear-ratio group including the other of the two gear ratios adjacent to the present gear ratio when the estimated engine revolution speed is out of the normal operation speed range.

2. The transmission system as claimed in claim 1, wherein the control unit is further configured to calculate an estimated downshift engine revolution speed produced in the event that a downshift-side gear ratio adjacent to the present gear ratio is selected by executing downshift and to calculate an estimated upshift engine revolution speed produced in the event that an upshift-side gear ratio adjacent to the present gear ratio is selected by executing upshift, the control unit being further configured to disengage the clutch for selecting the gear-ratio group including the upshift-side gear ratio when the estimated downshift engine revolution speed is out of the normal operation speed range, and to disengage the clutch for selecting the other gear-ratio group including the downshift-side gear ratio when the estimated upshift engine revolution speed is out of the normal operation speed range.

3. The transmission system as claimed in claim 1, wherein the control unit is further configured to select a desired gear ratio and to maintain a selected state of the desired gear ratio during a period after the clutch for selecting the gear-ratio group including the other of the two gear ratios is disengaged and until a shift command for shifting the present gear ratio to the desired gear ratio is outputted.

4. The transmission system as claimed in claim 1, a control unit is further configured to maintain states of the first and second clutches when the estimated engine revolution speed is within the normal engine revolution speed range.

5. The transmission system as claimed in claim 1, wherein the control unit includes a transmission control unit which is communicated with an engine control unit for controlling the engine.

6. The transmission system as claimed in claim 1, wherein the first gear-ratio group includes a first-speed gear ratio, a third-speed gear ratio, a fifth-speed gear ratio, and a reverse gear ratio, and the second gear-ratio group includes a second-speed gear ratio, a third-speed gear ratio and a fifth-speed gear ratio.

7. The transmission system as claimed in claim 1, wherein the twin-clutch transmission comprises a shift actuator employed for selecting a desired gear ratio.

8. The transmission as claimed in claim 1, wherein the estimated engine revolution speed is obtained by the following expression, (estimated engine revolution speed)=(present revolution speed)× (shifted gear ratio/present gear ratio).

9. A transmission control system controlling a twin-clutch transmission which comprises a first clutch for connecting a first gear-ratio group to an internal combustion engine and a second clutch for connecting a second gear-ratio group to the engine, the transmission control system comprising:
    a control unit configured,
    to obtain an engine revolution speed,
    to obtain a present gear ratio in operation,
    to calculate an estimated downshift engine revolution speed produced in the event that a downshift-side gear ratio adjacent to the present gear ratio is selected by downshift, on the basis of the engine revolution speed, the present gear ratio and the downshift-side gear ratio,
    to determine whether the estimated downshift engine revolution speed is out of a normal engine revolution speed range,
    to execute a pre-upshift control when the estimated downshift engine revolution speed is out of the normal engine revolution speed range, the pre-upshift control including an operation for disengaging the clutch for selecting the gear-ratio group which includes an upshift-side gear ratio adjacent to the present gear ratio,
    to calculate an estimated upshift engine revolution speed produced in the event that the upshift-side gear ratio is selected by upshift from the present gear ratio, on the basis of the engine revolution speed, the present gear ratio and the upshift-side gear ratio, to determine whether the estimated upshift engine revolution speed is out of a normal engine revolution speed range, to execute a pre-downshift control when the estimated upshift engine revolution speed is out of the normal engine revolution speed range, the pre-downshift control including an operation for disengaging the clutch for selecting the gear-ratio group which includes the downshift-side gear ratio.

10. A method of controlling a twin-clutch transmission which comprises a first shaft having gears for producing a first gear-ratio group, a second shaft having gears for producing a second gear-ratio group, a first clutch being capable of connecting the first shaft to an internal combustion engine so as to be selectable of one gear ratio of the first gear-ratio group, and a second clutch being capable of connecting the second shaft to the engine so as to be selectable of one gear ratio of the second gear-ratio group, the method comprising:

detecting an engine revolution speed;

detecting a present gear ratio selected from the gear ratios of the first and second gear-ratio groups;

calculating an estimated engine revolution speed produced when one of two gear ratios adjacent to the present gear ratio is selected by executing one of upshift and downshift, on the basis of the engine revolution speed, the present gear ratio and the one of the two gear ratios adjacent to the present gear ratio;

determining whether the estimated engine revolution speed is out of a normal engine revolution speed range; and disengaging one of the first and second clutches which is engaged to select the gear-ratio group including the other of the two gear ratios adjacent to the present gear ratio when the estimated engine revolution speed is out of the normal operation speed range.

11. A transmission control system controlling a transmission comprised of a first shaft having gears for producing a first gear-ratio group, a second shaft having gears for producing a second gear-ratio group, a first clutch being capable of connecting the first shaft to an internal combustion engine so as to be selectable of one gear ratio of the first gear-ratio group, and a second clutch being capable of connecting the second shaft to the engine so as to be selectable of one gear ratio of the second gear-ratio group, the transmission control system comprising:

engine revolution speed detecting means for detecting an engine revolution speed;

gear ratio detecting means for detecting a present gear ratio produced by engaging one of the first and second clutches;

estimated engine revolution speed calculating means for calculating an estimated engine revolution speed generated when an adjacent gear ratio adjacent to the present gear ratio is selected by one of upshift and downshift; and pre-shift control means for disengaging the other of the first and second clutches when the estimated engine revolution speed is out of a normal operation speed range.

* * * * *